United States Patent [19]

Riddles

[11] 4,244,092

[45] Jan. 13, 1981

[54] HYDRAULIC APPARATUS

[76] Inventor: Andrew M. Riddles, 5 Circle Rd., Scarsdale, N.Y. 10583

[21] Appl. No.: 2,538

[22] Filed: Jan. 11, 1979

[51] Int. Cl.³ .............................................. B23P 19/04
[52] U.S. Cl. ........................................ 29/252; 29/254
[58] Field of Search ........................ 29/252, 254, 255; 60/560, 550, 593, 586; 30/227; 81/52.3, 52.35; 83/617, 554; 173/131, 103

[56] References Cited

U.S. PATENT DOCUMENTS

| | | | |
|---|---|---|---|
| 1,879,883 | 9/1932 | Reinhold | 29/252 |
| 2,331,167 | 10/1943 | Brecht et al. | 29/254 |
| 3,038,510 | 6/1962 | Vorkoeper et al. | 144/193 D |
| 3,208,134 | 9/1965 | Krewson | 29/148.4 B |
| 3,390,446 | 7/1968 | Eltorre | 29/252 |
| 3,649,975 | 3/1972 | Spurgeon | 7/170 |
| 3,912,022 | 10/1975 | Smith | 173/93.7 |
| 4,121,671 | 10/1978 | West | 173/103 |

FOREIGN PATENT DOCUMENTS 1053428  3/1959  Fed. Rep. of Germany ............ 29/252

Primary Examiner—James L. Jones, Jr.

[57] ABSTRACT

A shock wave transmitted through the fluid to the piston of hydraulic force apparatus provides additive shock force to steady hydraulic force.

3 Claims, 1 Drawing Figure

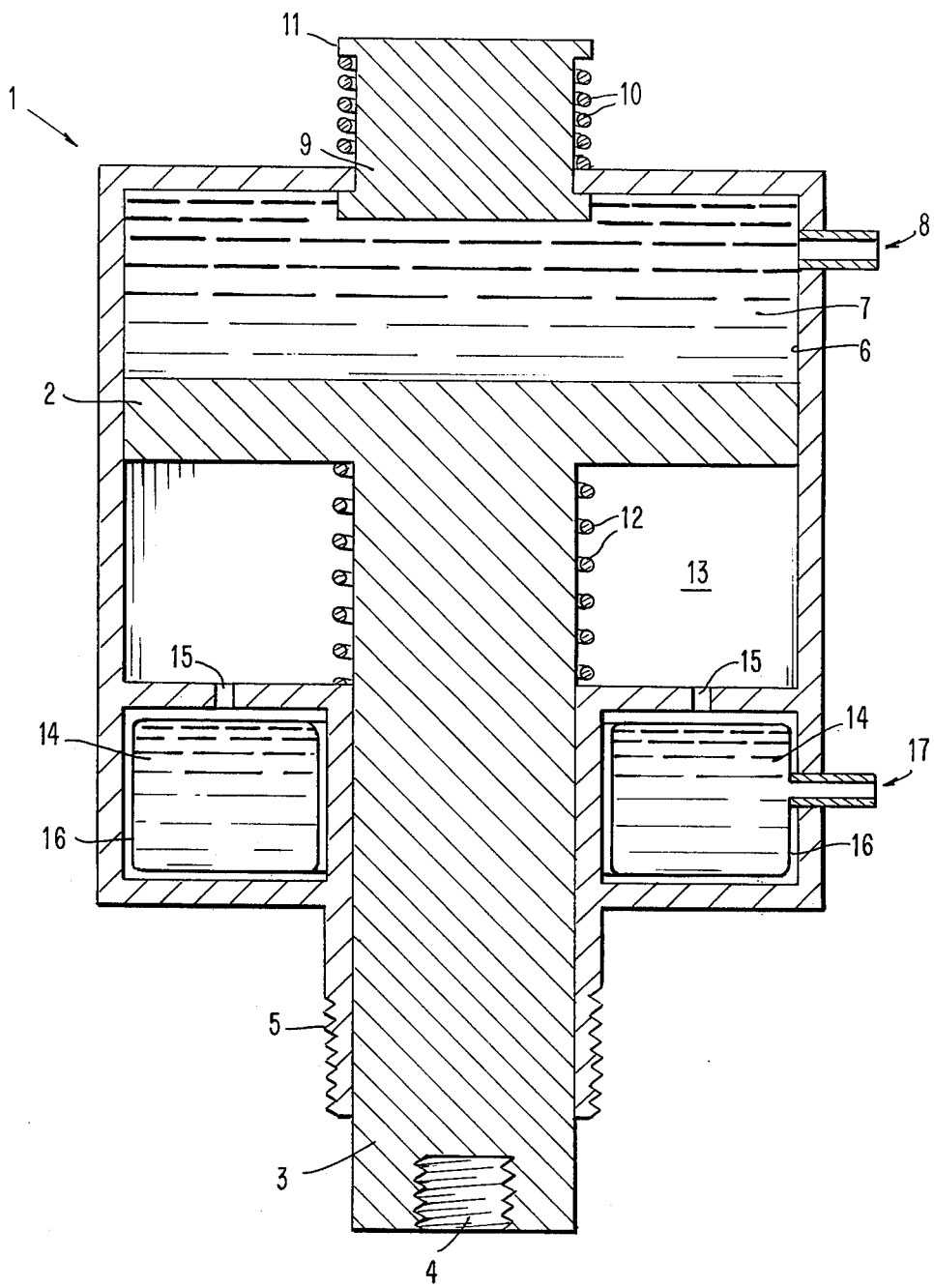

HYDRAULIC APPARATUS

The technical field of the invention is hydraulic apparatus as applied to the movement of members of a structure that receives its structural rigidity from a tight frictional contact of those members but which when movement of the members becomes desirable as for instance in disassembly the friction contact, coupled with corrosion or material deformation, requires application of excessive force.

BACKGROUND ART

At the present state of the art the apparatus used in separating such frictional contact members as taper fit contacting surfaces and temperature differential insertion contacting surfaces usually involves high leverage mechanical stress with independent provision for transmission of hammer blows to the contacting parts. The use of hydraulic force in this type of application would have the advantage that large stresses can be achieved that when separation occurs does not result in excessive motion and the stress application portion of hydraulic apparatus can usually be remote from the pump giving physical size advantages in places with reduced clearance. Heretofore, in the art, however, there has been no provision in a single apparatus for both hydraulic stress and hammer shock forces in a single hydraulic separating device.

DESCRIPTION OF DRAWING

The FIGURE illustrates the hydraulic stress and shock separating force device of the invention.

DISCLOSURE OF INVENTION

The invention provides for the application of hydraulic stress to the separation of two members under frictional contact and while under stress the shock stress of a hammer blow is transmitted through the hydraulic fluid to be added to the hydraulic stress. The combination operates to overcome the high friction of corrosion and material deformation and results in the effective application of force in separating the parts.

BEST MODE OF CARRYING OUT INVENTION

Referring to the FIGURE a hydraulic container or cylinder (1) is provided with a piston (2) that applies hydraulic stress through a shank (3) to the parts to be separated that are not shown. The shank (3) has a threaded opening (4) to permit attachment of specific tools such as drive pins and wedges. The cylinder (1) has a threaded portion (5) for engagement with the parts to be separated. A first fluid chamber (6) is provided having therein a fluid (7) placed under pressure from a pump not shown via a port (8). Shock stress is transmitted to the piston (2) through the fluid (7) by a plunger (9) which is held fully extended through the cover of the cylinder (1) by the spring (10) and which has an exposed portion (11) to receive hammer shock stress blows.

The piston (2) is held in the position of travel nearest the plunger (9) by spring (12) in cavity (13). The cavity (13) is connected to a lower reservoir cavity (14) by ports (15). The cavity (14) may be filled with a reservoir of the fluid (7) contained in a flexible container (16) and made available to the hydraulic pump through port (17).

While the invention is set forth in terms of specific structural relationships for the separation of two tapered parts, it will be readily apparent to one skilled in the art in the light of the principles set forth that many structures may be employed that provide additive shock stress to hydraulic stress producing the relative motion in separating parts attached to elements 4 and 5.

In operation, taking for example the separation of a tapered drive shaft from a tapered flywheel wherein there is a standard circle of threaded openings on the surface of the flywheel corresponding to the smaller end of the tapered drive shaft, an adapter is threaded on element 5 and bolts are inserted therethrough into the circle of threaded openings in the flywheel thereby firmly securing the flywheel to the cylinder. A drive pin member with a diameter smaller than the opening in the flywheel is threaded into element 4 and brought into contact with the drive shaft. Hydraulic stress is now applied to the piston (2) via the fluid (7) which is delivered under pressure through port (8) from the hydraulic pump which, in turn, may get a supply from the reservoir (14) through port (17). The chamber (13) usually contains air or a fluid that under displacement by movement of piston (2) will not strongly attenuate a shock wave applied to the piston (2). the piston (2) is urged against the fluid (7) in the chamber (6) by the spring (12). The chamber (13) is vented for piston displacement by the ports (15).

With the parts to be separated now under steady stress, an additional shock stress is applied by striking the plunger (9) on the surface (11). The plunger (9) is usually of smaller diameter than the piston (2) and the force from the resulting displacement shock wave in the fluid (7) is governed by the relative areas of the plunger (9) and piston (2). The shock wave supplies a momentary large stress to force the members being separated apart.

What has been described is a technique of applying additive shock stress to steady hydraulic stress in relative movement to be applied to one part with relation to another.

What is claimed is:

1. Hydraulic apparatus for providing additive shock stress to steady hydraulic stress in producing relative work motion between two objects comprising in combination:
    a fluid chamber containing a hydraulic fluid and having engaging means integral with the housing of said chamber to direct motion of a first of said two objects in a first direction;
    piston means in contact with said fluid in said chamber and having a work transmitting member thereof including engaging means to direct motion of the second of said two objects in a direction opposite to said first direction;
    pressure application means operable to introduce steady stress in said fluid against said piston means in excess of that produced by the force of gravity on the parts of the apparatus, and
    a reciprocating member having a striking force receiving portion at one end external to said fluid chamber and having the other end in contact with said fluid and operable to apply accelerated pressure to said fluid in response to striking force applied to said receiving portion.

2. The apparatus of claim 1 including a hydraulic fluid reservoir so positioned on said housing that displacement of said piston operates to transfer fluid to said fluid chamber.

3. The apparatus of claim 2 wherein said hydraulic fluid reservoir includes a flexible container acted upon by an intermediate fluid displaced by the back side of said piston.

* * * * *